United States Patent
Jiang et al.

(10) Patent No.: US 11,978,189 B2
(45) Date of Patent: May 7, 2024

(54) DEFECT DETECTION METHOD AND APPARATUS

(71) Applicant: CONTEMPORARY AMPEREX TECHNOLOGY CO., LIMITED, Ningde (CN)

(72) Inventors: Guannan Jiang, Ningde (CN); Annan Shu, Ningde (CN); Qiangwei Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/129,819

(22) Filed: Mar. 31, 2023

(65) Prior Publication Data

US 2024/0005469 A1    Jan. 4, 2024

Related U.S. Application Data

(63) Continuation of application No. PCT/CN2022/102727, filed on Jun. 30, 2022.

(51) Int. Cl.
*G06T 7/00* (2017.01)
*G06T 7/11* (2017.01)
*G06T 7/136* (2017.01)

(52) U.S. Cl.
CPC .............. *G06T 7/0002* (2013.01); *G06T 7/11* (2017.01); *G06T 7/136* (2017.01); *G06T 2207/20081* (2013.01)

(58) Field of Classification Search
CPC .......... G06N 3/045; G06T 2207/20084; G06T 7/0004; G06T 2207/20081; G06T 2207/30148; G06V 10/82; G06V 10/764; G06V 10/761

See application file for complete search history.

(56) References Cited

U.S. PATENT DOCUMENTS 7,602,962 B2    10/2009  Miyamoto et al.
11,216,932 B1    1/2022  Checka et al.
(Continued)

FOREIGN PATENT DOCUMENTS

CN    109598721 A    4/2019
CN    110648323 A    1/2020
(Continued)

OTHER PUBLICATIONS

Contemporary Amperex Technology Co., Limited, PCT/US2022/102727, International Search Report and Written Opinion, dated Mar. 16, 2023, 18 pgs.

(Continued)

*Primary Examiner* — Li Liu
(74) *Attorney, Agent, or Firm* — XSENSUS LLP

(57) ABSTRACT

Embodiments of this application provide a defect detection method and apparatus. The method includes: obtaining an image for inspection; performing anomaly detection on the image for inspection to obtain an anomaly region image corresponding to the image for inspection; and performing defect classification on the anomaly region image to obtain defect detection information of the image for inspection. The defect detection method of the embodiments of this application is divided into two steps of anomaly detection and defect classification. Anomaly detection is performed on the image for inspection first, and then defect classification needs to be performed only on an anomaly region, reducing the workload of defect classification, thereby improving the efficiency of defect detection.

20 Claims, 7 Drawing Sheets

(56) References Cited

U.S. PATENT DOCUMENTS

| | | | |
|---|---|---|---|
| 11,244,435 B2 | 2/2022 | Tan et al. | |
| 2004/0218806 A1 | 11/2004 | Miyamoto et al. | |
| 2013/0322735 A1* | 12/2013 | Tamura | G06T 7/0004 |
| | | | 382/144 |
| 2019/0108396 A1* | 4/2019 | Dal Mutto | G06V 20/52 |
| 2020/0111203 A1 | 4/2020 | Tan et al. | |
| 2020/0134868 A1* | 4/2020 | Liu | G06V 40/193 |
| 2021/0124912 A1* | 4/2021 | Lee | G06V 40/173 |
| 2022/0309637 A1 | 9/2022 | Checka et al. | |
| 2023/0018848 A1* | 1/2023 | Eline | G06N 3/088 |
| 2023/0259760 A1* | 8/2023 | Cheng | G06N 3/045 |
| | | | 706/15 |

FOREIGN PATENT DOCUMENTS

| | | | |
|---|---|---|---|
| CN | 111007073 A | 4/2020 | |
| CN | 112801298 A | 5/2021 | |
| CN | 113658121 A | 11/2021 | |
| CN | 113902710 A | 1/2022 | |
| CN | 114240892 A | 3/2022 | |
| CN | 114663392 A | 6/2022 | |

OTHER PUBLICATIONS

Extended European search report issued on Jan. 29, 2024, in corresponding European patent Application No. 22871101.6, 9 pages.

* cited by examiner

DEFECT DETECTION METHOD AND APPARATUS

CROSS-REFERENCE TO RELATED APPLICATION

This application is a continuation of PCT Patent Application No. PCT/CN2022/102727, entitled "DEFECT DETECTION METHOD AND APPARATUS" filed on Jun. 30, 2022, which is incorporated herein by reference in its entirety.

TECHNICAL FIELD

This application relates to the technical field of image processing, and in particular, to a defect detection method and apparatus.

BACKGROUND

In the field of modern industrial manufacturing, one or more defects exist in industrial products for the reasons of technology, device, and multi-process production. Therefore, carrying out defect detection on industrial products is a key link to control the quality of industrial products.

Because of too many network layers, it is difficult for the common target detection method and instance segmentation method to meet the detection speed requirements in the production process of industrial products. Therefore, an efficient defect detection method is urgently needed.

SUMMARY

This application provides a defect detection method and apparatus, to simplify defect detection processes and improve detection efficiency.

According to a first aspect, a defect detection method is provided, including: obtaining an image for inspection; performing anomaly detection on the image for inspection to obtain an anomaly region image corresponding to the image for inspection; and performing defect classification on the anomaly region image to obtain defect detection information of the image for inspection.

In the technical solution of this application, defect detection is divided into two steps of anomaly detection and defect classification. An anomaly region in the image for inspection is detected first so as to obtain the anomaly region image corresponding to the image for inspection. Then, defect classification needs to be performed only on the anomaly region, greatly reducing the workload of defect classification, thereby improving the efficiency of defect detection.

The defect detection method of this application can detect and classify multiple defects, and is applicable to multiple production processes, thereby avoiding the separate development of detection algorithms for each process and reducing development costs.

In some embodiments, the defect detection information includes defect type information and defect location information of the anomaly region image.

In some embodiments, the performing anomaly detection on the image for inspection to obtain an anomaly region image corresponding to the image for inspection includes: obtaining, based on an anomaly detection model, a difference image used to represent an anomaly region; and segmenting the difference image based on a segmentation threshold to obtain the anomaly region image.

In the foregoing embodiment, the anomaly detection model is used for inspecting the image for inspection, so as to segment out the anomaly region from the original image for inspection, so that subsequent defect classification is performed only on the anomaly region, greatly reducing the workload of defect classification, thereby improving the efficiency of defect detection.

In some embodiments, the anomaly detection model includes a pre-trained teacher network and a student network distilled from the teacher network; and the obtaining, based on an anomaly detection model, a difference image used to represent an anomaly region includes: inputting the image for inspection into both the teacher network and the student network so as to obtain feature images of different layers output by the teacher network and feature images of different layers output by the student network; and calculating a difference between each pixel of the feature image output by the teacher network and each pixel of the feature image output by the student network to obtain the difference image.

In the foregoing embodiment, the anomaly region is inferred from a difference between the pre-trained teacher network and the student network distilled from the teacher network in expressing a same image for inspection. In this way, comparison with defective image samples is spared, thereby sparing the need of manually collecting and marking a large amount of defect data in advance, and reducing labor costs. A degree of anomaly is defined and quantified through the expression difference between the feature images output by the two networks, and pixel-level anomaly detection of the image for inspection is implemented.

In some embodiments, the segmenting the difference image based on a segmentation threshold to obtain the anomaly region image includes: taking pixels higher than the segmentation threshold in the difference image as anomaly pixels and remaining pixels as normal pixels, so as to obtain the anomaly region image.

In the foregoing embodiment, the anomaly region image binarized is obtained by segmenting the difference image based on the segmentation threshold, so that a normal region and an anomaly region in the image for inspection can be clearly distinguished between and marked, and defect classification is performed only on the anomaly region but not the normal region in a subsequent defect classification process, thereby greatly reducing the workload of the defect classification process and improving the efficiency of the entire defect detection.

It should be understood that the anomaly region is a defect region. Each pixel has its own position coordinates. Therefore, when the difference image is segmented based on the segmentation threshold to obtain anomaly pixels, position coordinates of the anomaly pixels can be obtained, so that position information of the anomaly region or defect region can be obtained.

In some embodiments, before the performing anomaly detection on the image for inspection, the method further includes: training the student network of the anomaly detection model.

Before anomaly detection is performed on the image for inspection, the student network in the anomaly detection model is trained, which can improve the accuracy of the anomaly detection model.

In some embodiments, the training the student network includes: initializing the student network; inputting normal images into the teacher network and the student network to obtain feature images of all layers output by the teacher network and feature images corresponding to all layers output by the student network; minimizing differences between the feature images of all layers output by the teacher network and the feature images corresponding to all layers output by the student network in a distillation loss function; and updating parameters of the student network based on loss calculation results.

In the foregoing embodiment, during training of the student network, the student network acquires a feature extraction capability of the teacher network through knowledge distillation, and gains, through model compression, a capability of performing anomaly detection with few network parameters, and is simple in structure. Therefore, the network is easy to deploy and implements quick anomaly detection. In addition, by learning the normal images instead of defective images, the anomaly detection network can detect both known and unknown anomalies, and therefore has strong robustness because it avoids missed detection of unknown anomalies.

In some embodiments, the method further includes: calculating an optimal anomaly determining threshold of the anomaly detection model; and setting the segmentation threshold based on the optimal anomaly determining threshold.

An anomaly determining threshold is used to be compared with a maximum value in a difference image after training of an anomaly detection model is completed, so as to determine whether an image for inspection is a normal image or a defective image. In the foregoing embodiment, the optimal anomaly determining threshold is selected so that the anomaly detection model has a highest accuracy rate.

In some embodiments, the calculating an optimal anomaly determining threshold of the anomaly detection model includes: inputting a test sample into both the teacher network and the student network, where the test sample is a defective image or a normal image; determining a maximum value in difference images between the feature images output by the teacher network and the feature images output by the student network as an anomaly value of the test sample; under the condition that the anomaly value is greater than the anomaly determining threshold, determining that the test sample is a defective image, otherwise, determining that the test sample is a normal image; and calculating a maximum difference between a false positive rate and a true positive rate corresponding to each anomaly determining threshold in the anomaly detection model, and determining an anomaly determining threshold corresponding to the maximum difference as the optimal anomaly determining threshold; where the false positive rate is a percentage of test samples that are incorrectly determined as a defective image, and the true positive rate is a percentage of test samples that are correctly determined as a defective image.

In the foregoing embodiment, the difference between the false positive rate and the true positive rate is used to set the optimal anomaly determining threshold for the anomaly detection model, so that the anomaly detection model has a highest accuracy rate.

In some embodiments, the setting the segmentation threshold based on the optimal anomaly determining threshold includes: setting the segmentation threshold to be less than the optimal anomaly determining threshold.

In the foregoing embodiment, the segmentation threshold is set to be lower than the optimal anomaly determining threshold so as to mark possible anomaly pixels as abnormal, thereby avoiding missed detection, thereby improving the accuracy rate of anomaly detection.

In some embodiments, before the performing defect classification on the anomaly region image, the method further includes: obtaining one or more rectangular images including anomaly pixels from the anomaly region image; where the performing defect classification on the anomaly region image includes: performing defect classification on the one or more rectangular images.

In some embodiments, the performing defect classification on the one or more rectangular images includes: classifying the rectangular image(s) by using a defect classification model.

In the foregoing embodiment, the one or more rectangular images including anomaly pixels are obtained from the anomaly region image, which can speed up subsequent batch inference in defect classification of the anomaly region image, thereby improving the efficiency of defect detection.

In some embodiments, the classifying the rectangular image(s) by using a defect classification model includes: obtaining a feature vector of the rectangular image(s); calculating a similarity score of the rectangular image(s) for each known defect type based on the feature vector; and performing defect classification on the rectangular image(s) based on the similarity score.

In the foregoing embodiment, defect classification is performed on the rectangular image(s) based on the similarity score, so that the similarity of a defect type of the rectangular image(s) to any one of known defect types can be seen intuitively, so as to accurately determine the accuracy of defect classification.

In some embodiments, the obtaining a feature vector of the rectangular image(s) includes: extracting the feature vector of the rectangular image(s) by using a ResNet network model.

In the foregoing embodiment, the ResNet network model is simple in structure and therefore helps to improve the efficiency of defect classification, thereby improving the efficiency of the entire defect detection.

In some embodiments, the calculating a similarity score of the rectangular image(s) for each known defect type based on the feature vector includes: mapping the feature vector to a trained feature vector space, where the feature vector space includes a feature vector for the known defect type; and calculating a distance between the feature vector and the feature vector for the known defect type, so as to obtain the similarity score of the rectangular image(s) for each known defect type.

In the foregoing embodiment, a feature vector space trained can be visualized by using related code, so as to form a three-dimensional space, and the effect of training the defect classification model for all defect types can be intuitively seen by observing the feature vector space trained. This is quite different from the conventional method which presents only numerical abstract information.

In some embodiments, the performing classification on the rectangular image(s) based on the similarity score includes: under the condition that a maximum similarity score of the similarity scores is not lower than a first similarity threshold, outputting a defect type corresponding to the maximum similarity score; or under the condition that the similarity scores are all lower than a first similarity threshold, outputting an unknown defect type.

In the foregoing embodiment, the first similarity threshold is used as a lowest similarity threshold. Under the condition that the similarity scores are all lower than this score, it indicates that a defect of the rectangular image(s) bears a low similarity to all known defects and therefore is of an unknown defect type. In this embodiment of this application, an unknown defect or a new defect can be accurately and effectively identified.

In some embodiments, before the outputting a defect type corresponding to the maximum similarity score, the method further includes: under the condition that the defect type is a specified defect type, calculating area of the anomaly pixels in the rectangular image; where the outputting a defect type corresponding to the maximum similarity score includes: under the condition that the area is greater than an area threshold, outputting the defect type corresponding to the maximum similarity score.

In the foregoing embodiment, a specific defect area indicator can be flexibly controlled according to different area tolerance requirements for a defect.

In some embodiments, the outputting a defect type corresponding to the maximum similarity score includes: under the condition that the maximum similarity score is higher than a second similarity threshold, outputting the defect type corresponding to the maximum similarity score, where the second similarity threshold is greater than the first similarity threshold.

In the foregoing embodiment, the value of the second similarity threshold is set to be greater than the first similarity threshold, so that the indicator of the second similarity threshold can be set flexibly according to different requirements for classification accuracy.

In some embodiments, the defect detection information further includes a similarity score corresponding to a defect type.

In the foregoing embodiment, when the defect detection information includes a similarity score corresponding to a defect type, a similarity of a defect type of the image for inspection to a known defect type can be seen intuitively, helping the staff to determine, based on the similarity score, whether manual determining needs to be performed to check whether the defect detection is accurate.

According to a second aspect, this application provides a defect detection apparatus including: an obtaining unit configured to obtain an image for inspection; and a processing unit configured to perform anomaly detection on the image for inspection to obtain an anomaly region image corresponding to the image for inspection; where the processing unit is further configured to perform defect classification on the anomaly region image to obtain defect detection information of the image for inspection.

In some embodiments, the defect detection information includes defect type information and defect location information of the anomaly region image.

In some embodiments, the processing unit is further configured to obtain, based on an anomaly detection model, a difference image used to represent an anomaly region; and segment the difference image based on a segmentation threshold to obtain the anomaly region image.

In some embodiments, the anomaly detection model includes a pre-trained teacher network and a student network distilled from the teacher network; the processing unit is further configured to input the image for inspection into both the teacher network and the student network so as to obtain a feature image output by the teacher network and a feature image output by the student network; and the processing unit is further configured to calculate a difference between each pixel of the feature image output by the teacher network and each pixel of the feature image output by the student network to obtain the difference image.

In some embodiments, the processing unit is further configured to take pixels higher than the segmentation threshold in the difference image as anomaly pixels and remaining pixels as normal pixels, so as to obtain the anomaly region image.

In some embodiments, the processing unit is further configured to train the student network of the anomaly detection model.

In some embodiments, the processing unit is further configured to initialize the student network; the processing unit is further configured to input normal images into the teacher network and the student network to obtain feature images of all layers output by the teacher network and feature images corresponding to all layers output by the student network; the processing unit is further configured to minimize differences between the feature images of all layers output by the teacher network and the feature images corresponding to all layers output by the student network in a distillation loss function; and the processing unit is further configured to update parameters of the student network based on loss calculation results.

In some embodiments, the processing unit is further configured to calculate an optimal anomaly determining threshold of the optimal anomaly detection model of the anomaly detection model; and the processing unit is further configured to set the segmentation threshold based on the optimal anomaly determining threshold.

In some embodiments, the processing unit is further configured to input a test sample into both the teacher network and the student network, where the test sample is a defective image or a normal image; the processing unit is further configured to determine a maximum value in difference images between the feature images output by the teacher network and the feature images output by the student network as an anomaly value of the test sample; under the condition that the anomaly value is greater than the anomaly determining threshold, the processing unit is further configured to determine that the test sample is a defective image, otherwise, determine that the test sample is a normal image; and the processing unit is further configured to calculate a difference between a false positive rate and a true positive rate corresponding to each anomaly determining threshold in the anomaly detection model, and determine an anomaly determining threshold corresponding to a maximum difference as the optimal anomaly determining threshold; where the false positive rate is a percentage of test samples that are incorrectly determined as a defective image, and the true positive rate is a percentage of test samples that are correctly determined as a defective image.

In some embodiments, the processing unit is further configured to set the segmentation threshold to be less than the optimal anomaly determining threshold.

In some embodiments, the obtaining unit is further configured to obtain one or more rectangular images including anomaly pixels from the anomaly region image; and the processing unit is further configured to perform defect classification on the one or more rectangular images.

In some embodiments, the processing unit is further configured to classify the rectangular image(s) by using a defect classification model.

In some embodiments, the obtaining unit is further configured to obtain a feature vector of the rectangular image(s); the processing unit is further configured to calculate a similarity score of the rectangular image(s) for each known defect type based on the feature vector; and the processing unit is further configured to perform defect classification on the rectangular image(s) based on the similarity score.

In some embodiments, the processing unit is further configured to extract the feature vector of the rectangular image(s) by using a ResNet network model.

In some embodiments, the processing unit is further configured to map the feature vector to a trained feature vector space, where the feature vector space includes a feature vector for the known defect type; and the processing unit is further configured to calculate a distance between the feature vector and the feature vector for the known defect type, so as to obtain the similarity score of the rectangular image(s) for each known defect type.

In some embodiments, the apparatus further includes an outputting unit 503; where under the condition that a maximum similarity score of the similarity scores is not lower than a first similarity threshold, the outputting unit is configured to output a defect type corresponding to the maximum similarity score; or under the condition that the similarity scores are all lower than a first similarity threshold, the outputting unit 503 is configured to output an unknown defect type.

In some embodiments, the processing unit is further configured to: under the condition that the defect type is a specified defect type, calculate area of the anomaly pixels in the rectangular image; and the outputting unit 503 further includes: under the condition that the area is greater than an area threshold, outputting the defect type corresponding to the maximum similarity score.

In some embodiments, the outputting unit 503 is further configured to: under the condition that the maximum similarity score is higher than a second similarity threshold, output the defect type corresponding to the maximum similarity score, where the second similarity threshold is greater than the first similarity threshold.

In some embodiments, the defect detection information further includes a similarity score corresponding to a defect type.

The defect detection method of the embodiments of this application is divided into two steps of anomaly detection and defect classification. Anomaly detection is performed on the image for inspection first, and then defect classification needs to be performed only on an anomaly region, reducing the workload of defect classification, thereby improving the efficiency of defect detection.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
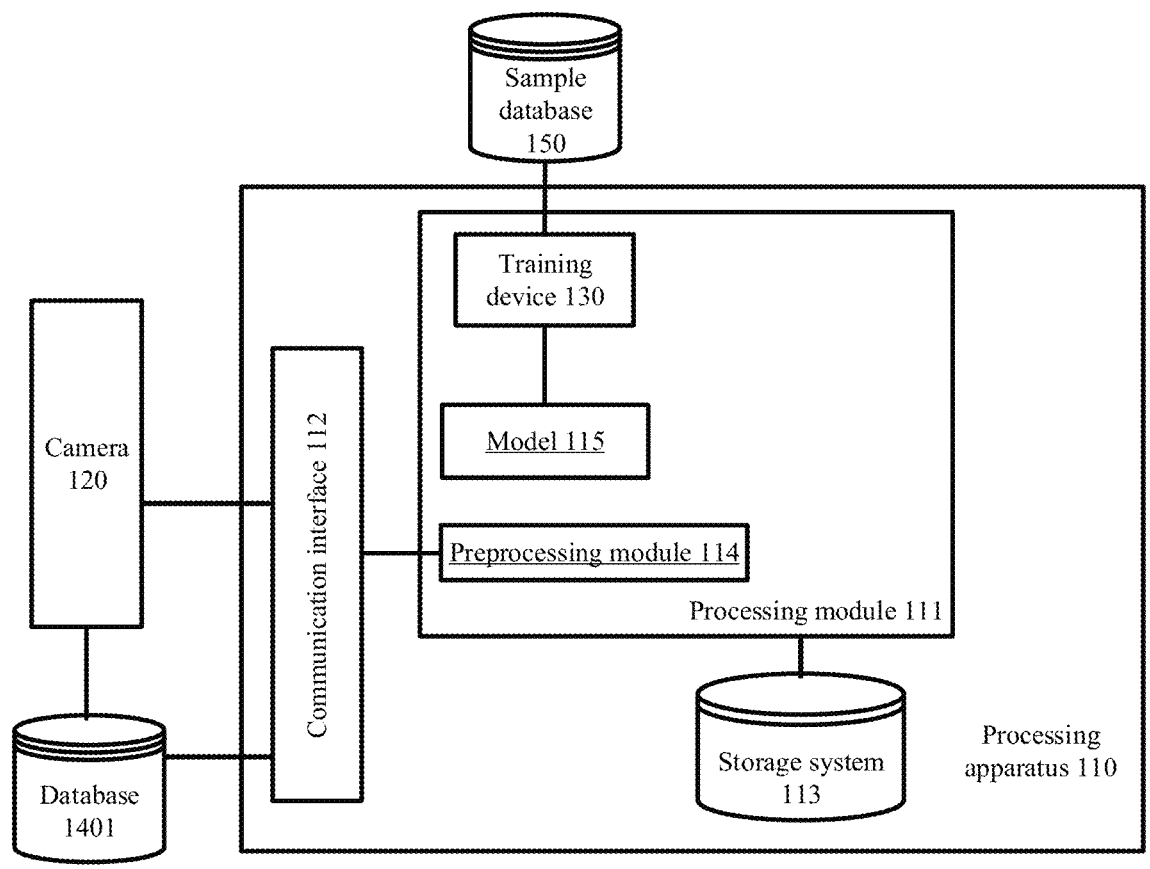
FIG. 1 is a schematic diagram of a system architecture according to an embodiment of this application.

The accompanying drawings are not drawn to scale.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the description of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the apparatuses or components mentioned must have specific orientations or must be constructed or manipulated according to specific orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all refer to the orientations as shown in the drawings, and do not limit the specific structure of this application. In the descriptions of this application, it should be further noted that unless otherwise specified and defined explicitly, the terms "installment", "link", and "connection" should be understood in their general senses. For example, the terms may be a fixed connection, a detachable connection, or an integrated connection, or may be a direct connection, or an indirect connection through an intermediate medium. A person of ordinary skill in the art can understand specific meanings of these terms in this application as appropriate to specific situations.

FIG. 1 is a schematic diagram of a system architecture according to an embodiment of this application.

In the system architecture shown in FIG. 1, a camera 120 is a device that is connected to a current network and that can be used to photograph an electric vehicle battery. The camera 120 may transmit an image for inspection through information interaction with the network. There may be multiple cameras 120. An image for inspection captured by the camera 120 may be directly transmitted to a processing apparatus 110, or may be stored in a database 140 first and then accessed by the processing apparatus 110 from the database 140. Passive obtaining of an image for inspection is used as an example. A new image for inspection captured by the camera 120 may be captured by the processing apparatus 110 in real time, or may be stored in the database 140 first, and then accessed by the processing apparatus 110 from the database 140.

The processing apparatus 110 is communicatively connected to the camera 120. Specifically, the processing apparatus 110 may include a communication interface 112 so as to establish a communication connection to other devices. The communication connection may be wired or wireless.

The processing apparatus 110 may be an electronic device or system capable of processing data, for example, a computer. The processing apparatus 110 may include a processing module 111 configured to implement defect detection of the image for inspection. The processing module 111 may specifically be one or more processors. The processor may be any type of processor, which is not limited in this embodiment of this application.

The processing apparatus 110 may further include a storage system 113. The storage system 113 may be configured to store data and instructions, for example, computer-executable instructions for implementing the technical solutions of the embodiments of this application. The processing apparatus 110 may call data, instructions, and the like in the storage system 113, and may also store data, instructions, and the like in the storage system 113. The storage system 113 may specifically be one or more memories. The memory may be any type of memory, which is not limited in this embodiment of this application.

The storage system 113 may be provided inside the processing apparatus 110, or may be provided outside the processing apparatus 110. If the storage system 113 is provided outside the processing apparatus 110, the processing apparatus 110 can access the storage system 113 through a data interface.

The processing apparatus 110 may further include other common devices, for example, an output device configured to output a defect detection result.

The processing apparatus 110 further includes a preprocessing module 114 configured to preprocess the image for inspection, for example, extracting a feature vector of the image for inspection. For example, the processing apparatus 110 extracts a feature vector by using the following technical solution of the embodiments of this application.

The processing apparatus 110 is further configured with a trained model 115. In this case, the processing module 111 may use the model 115 to perform corresponding processing. In this application, the model 115 may be trained by using the technical solutions of the embodiments of this application.

For example, the model 115 may be a model for defect detection. A training device 130 may obtain a defect detection model through training based on training data in a sample database 150. In this way, the processing module 111 may use the defect detection model to obtain a defect type and location information of the image for inspection.

For obtaining the feature vector of the image for inspection, the feature vector may be extracted by the preprocessing module 114 first. Then, the feature vector is input into the model 115 so as to obtain the defect type and location information of the image for inspection.

It should be understood that FIG. 1 is only a schematic diagram of a system architecture according to an embodiment of this application, and positional relationships among the device, component, module, and the like shown in the figure do not constitute any limitation.

In some possible embodiments, the model 115 obtained by the training device 130 through training may be a model obtained based on machine learning, for example, a model built based on a neural network. The neural network may be convolutional neural network (convolutional neural networks, CNN), recurrent neural network (recurrent neural network, RNN), deep convolutional neural network (deep convolutional neural networks, DCNN), or the like.

Currently, from a perspective of market development, electric vehicle batteries are increasingly widely used. Electric vehicle batteries are not only used in primary power supply systems such as hydro, wind, thermal, and solar power plants, but also widely used in electric transportation tools such as electric bicycles, electric motorcycles, and electric vehicles, and fields such as military equipment and aerospace. With continuous expansion of application fields of electric vehicle batteries, market demands for the electric vehicle batteries are also increasing. During production of electric vehicle batteries, different defects may appear in multiple processes, for example, anode die cutting, cathode die cutting, winding, and gravure, and visual technology needs to be applied to perform automatic detection. If one visual inspection method is developed for each process, costs are high in development and later deployment and maintenance. Currently, a large amount of defect data needs to be collected and marked in advance in all common target detection methods and instance segmentation methods. This not only requires human resources, but also leads to many defect types in actual products. In addition, a detection network needs to make accurate definitions of the defect types, but it is often impossible to accurately define all defect types in the real world, resulting in the risk of missed detection of defects. In addition, it is difficult for existing detection networks to meet the high-speed detection requirements in the production process of electric vehicle batteries because the networks have many layers.

In view of this, an embodiment of this application provides a defect detection method in which defect detection is divided into two steps of anomaly detection and defect classification. A defect location is determined first, and then defect classification needs to be performed only on an anomaly region, reducing the workload of defect classification, thereby improving the efficiency of defect detection.

The defect detection method and apparatus provided in the embodiments of this application can be used for but are not limited to defect detection of electric vehicle batteries, and can also be applied to defect detection of other types of products in modern industrial manufacturing. The main process of the defect detection method in the embodiments of this application is described below with reference to FIG. 2.

Figure 2:
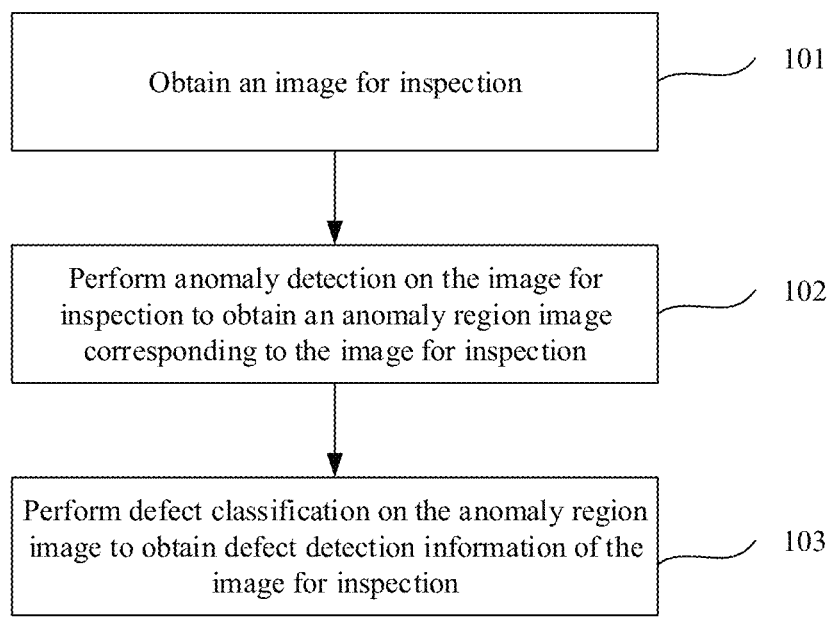
FIG. 2 is a schematic diagram of a defect detection method according to an embodiment of this application.

FIG. 2 is a schematic flowchart of a defect detection method 100 according to an embodiment of this application. The defect detection method 100 includes the following steps.

101: Obtain an image for inspection.

102: Perform anomaly detection on the image for inspection to obtain an anomaly region image corresponding to the image for inspection.

103: Perform defect classification on the anomaly region image to obtain defect detection information of the image for inspection.

Specifically, in step 101, the image for inspection may be a picture photographed by a charge coupled device (charge coupled device, CCD) camera, or a picture photographed by other cameras. This is not limited in this application. Production of electric vehicle batteries generally includes multiple production processes. When an electric vehicle battery comes to the final process, the electric vehicle battery may be photographed by a CCD camera to obtain the image for inspection.

Specifically, in step 102, the anomaly region may be marked in the image for inspection to obtain the anomaly region image corresponding to the image for inspection. The anomaly region image includes the anomaly region, that is, a region with a defect, and also includes a normal region, that is, a region with no defect.

In this application, defect detection is divided into two steps of anomaly detection and defect classification. An anomaly region in the image for inspection is detected first so as to obtain the anomaly region image corresponding to the image for inspection. Then, defect classification needs to be performed only on the anomaly region, greatly reducing the workload of defect classification, thereby improving the efficiency of defect detection.

The defect detection method in this embodiment of this application can detect and classify multiple defects, and is applicable to multiple production processes, thereby avoiding the separate development of detection algorithms for each process and reducing development costs.

In some embodiments, the defect detection information includes defect type information and defect location information of the anomaly region image.

It should be understood that when the image for inspection includes one or more defects, the defect detection information may include one or more defect types and corresponding defect location information.

In some embodiments, the performing anomaly detection on the image for inspection to obtain an anomaly region image corresponding to the image for inspection includes: obtaining, based on an anomaly detection model, a difference image used to represent an anomaly region; and segmenting the difference image based on a segmentation threshold to obtain the anomaly region image.

Pixels are a minimum unit in images represented by a digital sequence. The image for inspection is composed of multiple pixels, and each pixel has its own location coordinates and color value. The difference image may be understood as an image including location coordinates of each pixel of the image for inspection and a corresponding anomaly score of the pixel, where based on the anomaly detection model, the pixel has an anomaly score, and each anomaly score can represent the possibility that anomaly occurs on the corresponding pixel. Then, segmentation is performed for each pixel based on the segmentation threshold and the difference image, so that each pixel is marked as a normal pixel or an anomaly pixel, so as to convert the image for inspection into an anomaly region image that has a normal region and the anomaly region.

In the foregoing embodiment, the anomaly detection model is used for inspecting the image for inspection, so as to segment out the anomaly region from the original image for inspection, so that subsequent defect classification is performed only on the anomaly region, greatly reducing the workload of defect classification, thereby improving the efficiency of defect detection.

Figure 3:
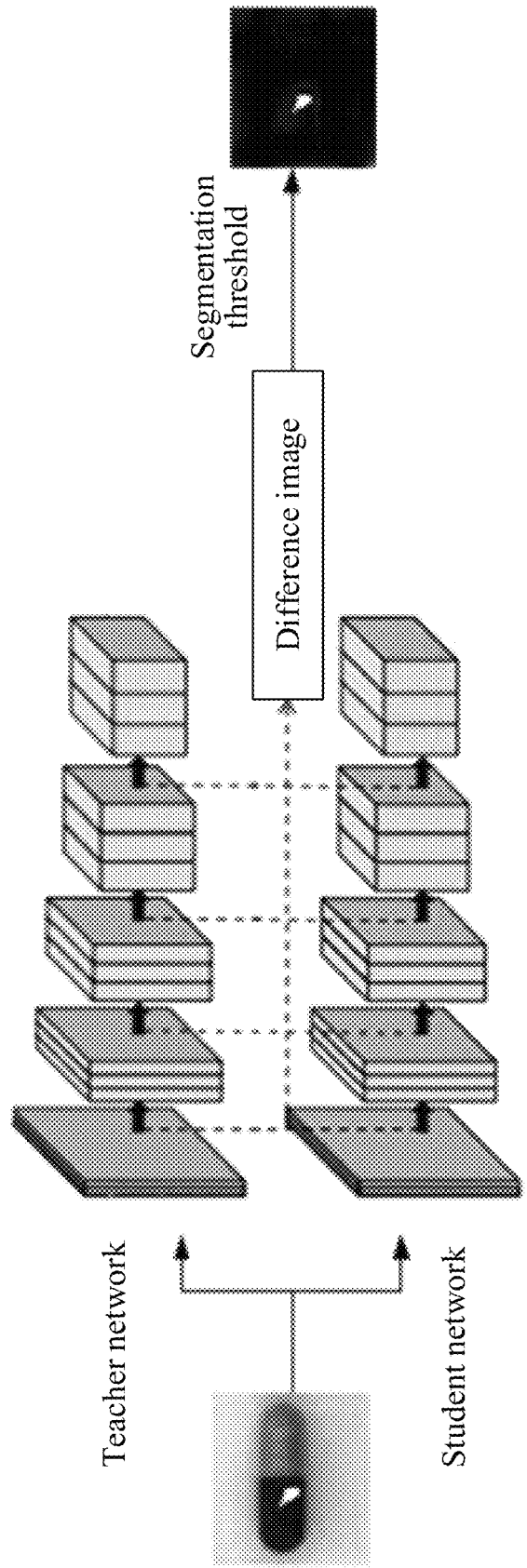
FIG. 3 is a schematic structural diagram of an anomaly detection model according to an embodiment of this application.

In this embodiment of this application, refer to FIG. 3. FIG. 3 is a schematic structural diagram of an anomaly detection model according to an embodiment of this application. The anomaly detection model includes a pre-trained teacher network and a student network distilled from the teacher network. The obtaining, based on an anomaly detection model, a difference image used to represent an anomaly region includes: inputting the image for inspection into both the teacher network and the student network so as to obtain a feature image output by the teacher network and a feature image output by the student network; and calculating a difference between each pixel of the feature image output by the teacher network and each pixel of the feature image output by the student network to obtain the difference image.

As shown in FIG. 3, the pre-trained teacher network may be a network model trained in advance, and such model has powerful feature extraction and image analysis capabilities. For example, the pre-trained teacher network may be AlexNet, VGG, GoogLeNet, ResNet, DenseNet, SENet, ShuteNet, or MobileNet. The student network is a randomly initialized model that is distilled from the pre-trained teacher network. The teacher-student model is used in knowledge distillation, and a complex and large network is used as the teacher network, the student network is simple in structure, and the teacher network is used to assist the training of the student network. Due to its strong learning capability, the teacher network can transfer its learned knowledge to the student network with a weak learning capability to improve the generalization capability of the student network. The teacher network transfers the capability of feature extraction and image classification from normal images to the student network. The student network does not have knowledge of anomaly input, while the teacher network has knowledge of anomaly input. As a result, in a case of anomaly input, the two networks have a potential difference in expression. Therefore, the difference image between the feature images output by the two networks may be used to define and quantify anomaly, and then whether a pixel is abnormal and how abnormal the pixel is determined based on an anomaly value of the pixel in the difference image, so as to implement pixel-level anomaly detection on images.

Therefore, constructing the teacher-student network can avoid the difficulty of collecting and marking defective image samples in traditional methods, saving a large amount of human and material resources. In addition, training a high-quality student network through knowledge distillation transfers the feature extraction capability, and anomaly definition and anomaly degree quantification are implemented through the expression difference between the feature images output by the two networks, so that pixel-level anomaly detection of the image for inspection is implemented.

For example, as shown in FIG. 3, when the image for inspection is input into both the teacher network and the student network, feature images of different layers can be extracted from different locations of the two networks. A combination of mean square errors of the feature images output by the two networks is used as the difference image, that is, an anomaly value distribution image.

In some embodiments, as shown in FIG. 3, the segmenting the difference image based on a segmentation threshold to obtain the anomaly region image includes: taking pixels higher than the segmentation threshold in the difference image as anomaly pixels and remaining pixels as normal pixels, so as to obtain the anomaly region image.

The segmentation threshold may be a preset value. The difference image being segmented based on the segmentation threshold means performing dichotomy on an anomaly score of each pixel of the difference image based on the segmentation threshold. For example, a pixel with an anomaly score greater than the segmentation threshold is classified into an anomaly region, and a pixel with an anomaly score lower than the segmentation threshold is classified into a normal region. Multiple adjacent pixels in the anomaly region form one anomaly region, and there may be one or more anomaly regions. It should be understood that a larger segmentation threshold means fewer pixels being classified into the anomaly region, and that a smaller segmentation threshold means more pixels being classified into the anomaly region. In other words, the value of the segmentation threshold determines the size of the anomaly region.

In the foregoing embodiment, the anomaly region image binarized is obtained by segmenting the difference image based on the segmentation threshold, so that a normal region and an anomaly region in the image for inspection can be clearly distinguished between and marked, and defect classification is performed only on the anomaly region but not the normal region in a subsequent defect classification process, thereby greatly reducing the workload of the defect classification process and improving the efficiency of the entire defect detection.

It should be understood that the anomaly region is a defect region. Each pixel has its own position coordinates. Therefore, when the difference image is segmented based on the segmentation threshold to obtain anomaly pixels, position coordinates of the anomaly pixels can be obtained, so that position information of the anomaly region or defect region can be obtained.

In some embodiments, before the performing anomaly detection on the image for inspection, the defect detection method 100 further includes: training the student network of the anomaly detection model.

To improve the accuracy of the anomaly detection model, the student network in the anomaly detection model may be trained before anomaly detection is performed on the image for inspection.

Figure 4:
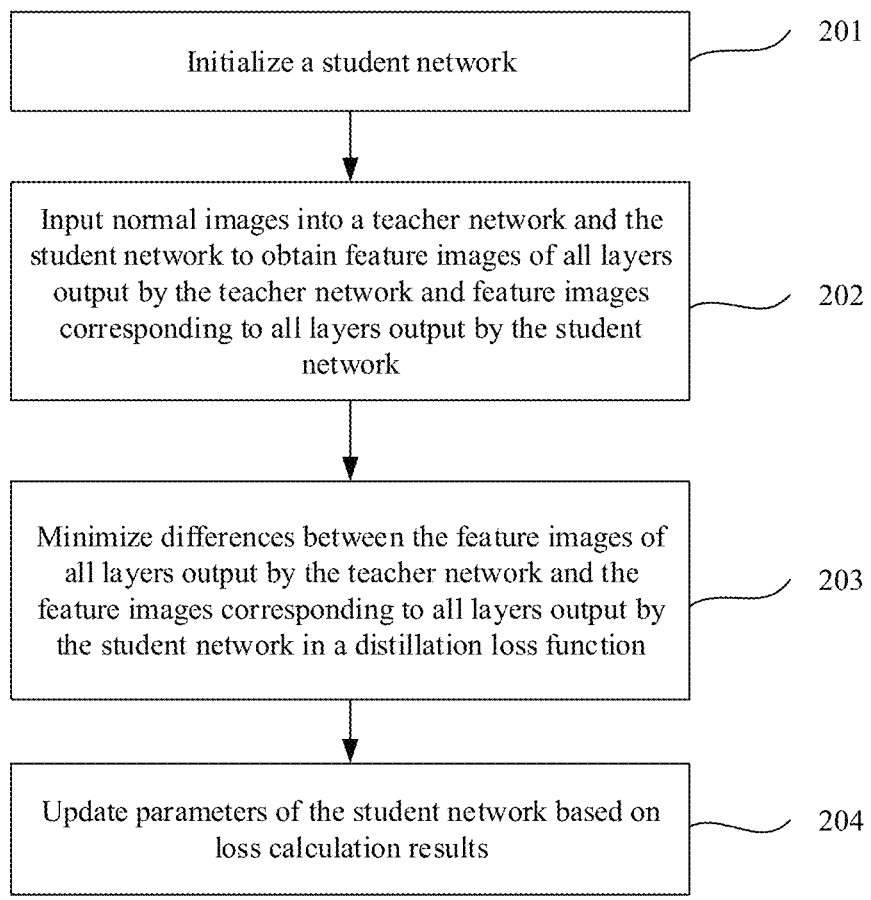
FIG. 4 is a schematic diagram of a method for training a student network according to an embodiment of this application.
Figure 5:
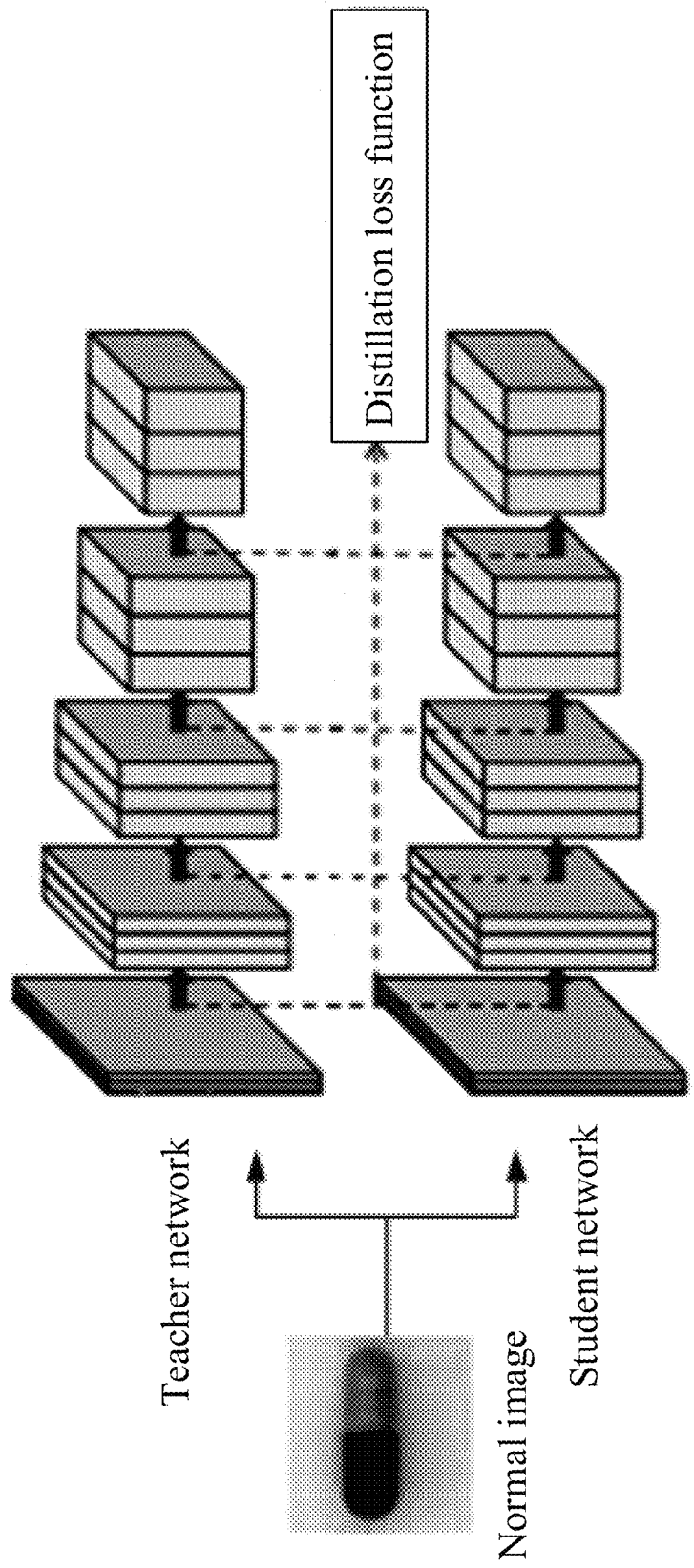
FIG. 5 is a schematic structural diagram of training a student network according to an embodiment of this application.

In some embodiments, refer to FIG. 3 and FIG. 5. FIG. 4 is a schematic flowchart of a method 200 for training a student network according to an embodiment of this application. FIG. 5 is a schematic structural diagram of training a student network according to an embodiment of this application. The normal image is an image with no defect. The method 200 for training a student network includes the following steps.

201: Initialize the student network.

202: Input normal images into the teacher network and the student network to obtain feature images of all layers output by the teacher network and feature images corresponding to all layers output by the student network.

203: Minimize differences between the feature images of all layers output by the teacher network and the feature images corresponding to all layers output by the student network in a distillation loss function.

204: Update parameters of the student network based on loss calculation results.

Steps 202 to 204 are repeated to perform continuous iterative optimization until convergence is realized.

As shown in FIG. 5, when the student network is trained, the normal images are input into the teacher network and the student network. Four feature images of different layers are output from the two networks, and the four feature images have different resolutions. A distillation loss function such as the L2 loss function is designed to minimize a distance between the two networks at each layer. The minimum distance between the two networks may be, for example, a minimum mean square error of the feature images of different layers of the two networks.

Therefore, during training of the student network, the student network acquires a feature extraction capability of the teacher network through knowledge distillation, and gains, through model compression, a capability of performing anomaly detection with few network parameters, and is simple in structure. Therefore, the network is easy to deploy and implements quick anomaly detection. In addition, by learning the normal images instead of defective images, the anomaly detection network can detect both known and unknown anomalies, and therefore has strong robustness because it avoids missed detection of unknown anomalies.

In this embodiment of this application, the normal image may be an image with no defect under various lighting environments. When the student network is trained, image enhancement means such as brightness jitter and saturation jitter of images may also be applied so that the anomaly detection model has strong lighting robustness.

In some embodiments, the defect detection method 100 may further include: calculating an optimal anomaly determining threshold of the anomaly detection model; and setting the segmentation threshold based on the optimal anomaly determining threshold.

An anomaly determining threshold is used to be compared with a maximum value in a difference image after training of an anomaly detection model is completed, so as to determine whether an image for inspection is a normal image or a defective image. The optimal anomaly determining threshold can make the anomaly detection model have a highest accuracy rate.

The segmentation threshold needs to be set based on the segmentation effect of the anomaly region in the anomaly region image, to ensure that all anomaly pixels are segmented out but not too many normal pixels are segmented out. In other words, when the difference image is segmented based on the segmentation threshold, best efforts are made to mark actual anomaly pixels as abnormal and reduce normal pixels that are marked as abnormal, so as to improve the efficiency of subsequent defect classification.

In some embodiments, the optimal anomaly determining threshold of the anomaly detection model may be calculated in the following manner: inputting a test sample into both the teacher network and the student network, where the test sample is a defective image or a normal image; determining a maximum value in difference images between the feature images output by the teacher network and the feature images output by the student network as an anomaly value of the test sample; under the condition that the anomaly value is greater than the anomaly determining threshold, determining that the test sample is a defective image, otherwise, determining that the test sample is a normal image; and calculating a difference between a false positive rate and a true positive rate corresponding to each anomaly determining threshold in the anomaly detection model, and determining an anomaly determining threshold corresponding to a maximum difference as the optimal anomaly determining threshold; where the false positive rate is a percentage of test samples that are incorrectly determined as a defective image, and the true positive rate is a percentage of test samples that are correctly determined as a defective image.

The test sample is a defective image or a normal image. A defective image may include one type of defect or multiple types of defects. A normal image may be an image with no defect. Alternatively, a normal image may be a defective image with a specific degree of fault tolerance. In other words, an image may include a defect, but a defect of a specific small range is allowed in defect detection, and therefore the image may be considered a normal image.

It should be understood that after training of the anomaly detection model is completed, it is necessary to set the anomaly determining threshold, and determine, based on the anomaly determining threshold and the difference image, whether the image for inspection is a defective image. Specifically, different anomaly determining thresholds of the test samples mean different inferring accuracy rates of the anomaly detection model.

In order that the anomaly detection model has a highest accuracy rate, the difference between the false positive rate and the true positive rate may be used to set the optimal anomaly determining threshold.

In some embodiments, the segmentation threshold may be set to be less than the optimal anomaly determining threshold.

The segmentation threshold is generally lower than the optimal anomaly determining threshold so as to mark possible anomaly pixels as abnormal, thereby avoiding missed detection, thereby improving the accuracy rate of anomaly detection.

In some embodiments, before the step 103 of performing defect classification on the anomaly region image, the method 100 may further include: obtaining one or more rectangular images including anomaly pixels from the anomaly region image. In step 103, the performing classification on the anomaly region image may be performing defect classification on the one or more rectangular images.

The obtaining one or more rectangular images including anomaly pixels from the anomaly region image may be understood as cutting the anomaly region image by using a preset rectangular frame, namely, cutting the anomaly region of the anomaly region image into the rectangular image(s) of a preset size. Specifically, an anomaly region of a large area is cut into multiple smaller rectangular images, and an anomaly region of a small area is cut into one rectangular image.

The one or more rectangular images including anomaly pixels are obtained from the anomaly region image, which can speed up subsequent batch inference in defect classification of the anomaly region image, thereby improving the efficiency of defect detection.

Certainly, in other embodiments of this application, an anomaly region may alternatively be cut into other shapes. This is not limited in this application.

In some embodiments, the performing defect classification on the one or more rectangular images includes: classifying the rectangular image(s) by using a defect classification model.

The defect classification model can perform defect classification on a rectangular image including anomaly pixels. For example, the defect classification model may be a low-complexity ResNet network model. The ResNet network model is a common classification model. To make inference or classification faster, ResNet14 with a simpler model structure than ResNet18 may be used.

To make the accuracy of defect classification higher, a metric learning loss function is used to replace a softmax function, to calculate a similarity score for each defect type together with the ResNet14 model, so as to perform defect classification on the rectangular image(s).

In some embodiments, when the rectangular image(s) are classified by using the defect classification model, a feature vector of the rectangular image(s) may be obtained first; then a similarity score of the rectangular image(s) for each known defect type is calculated based on the feature vector; and then defect classification is performed on the rectangular image(s) based on the similarity score.

In some embodiments, the feature vector of the rectangular image(s) is extracted by using a ResNet network model.

It should be understood that the ResNet network model can extract feature vectors. The ResNet network model is simple in structure and therefore helps to improve the efficiency of defect classification, thereby improving the efficiency of the entire defect detection. Certainly, in other embodiments, other models may also be used to extract feature vectors. This is not limited in this application.

In some embodiments, when the similarity score of the rectangular image(s) for each known defect type is calculated based on the feature vector: the feature vector may be mapped to a trained feature vector space first, where the feature vector space includes a feature vector for the known defect type; and then a distance between the feature vector and the feature vector for the known defect type is calculated, so as to obtain the similarity score of the rectangular image(s) for each known defect type.

The feature vector space may be trained by using a metric learning loss function. Specifically, a set of defective image samples of a known defect type is collected, and all the defective images of a known defect type are input into a classification model, such as ResNet14. The classification model extracts defect feature vectors of the defective images of a known defect type, and the defect feature vectors extracted are put into an initial feature vector space. Then distribution of the defect feature vectors is optimized in the feature vector space by using the metric learning loss function, that is, a distance of defect feature vectors of a same type is reduced, and a distance of defect feature vectors of different types or having quite different features, so as to obtain a feature vector space with proper location distribution, that is, a well-trained feature vector space. In addition, a feature vector space trained can be visualized by using related code, so as to form a three-dimensional space, the effect of training the defect classification model for all defect types can be intuitively seen by observing the feature vector space trained. This is quite different from the conventional method which presents only numerical abstract information.

After the feature vector of the rectangular image(s) is extracted, the feature vector is mapped to a trained feature vector space, and a distance between the feature vector and the feature vector for the known defect type in the feature vector space is calculated, so as to obtain the similarity score of the rectangular image(s) for each known defect type and perform defect classification on the rectangular image(s) based on the similarity score.

Defect classification is performed on the rectangular image(s) based on the similarity score, so that the similarity of a defect type of the rectangular image(s) to any one of known defect types can be seen intuitively, so as to accurately determine the accuracy of defect classification.

In some embodiments, under the condition that a maximum similarity score of the similarity scores is not lower than a first similarity threshold, a defect type corresponding to the maximum similarity score is output; or under the condition that the similarity scores are all lower than a first similarity threshold, an unknown defect type is output.

The first similarity threshold is used as a lowest similarity threshold. Under the condition that the similarity scores are all lower than this score, it indicates that a defect of the rectangular image(s) bears a low similarity to all known defects and therefore is of an unknown defect type or a new defect. When similarity scores are greater than the first similarity threshold, a defect type with a highest similarity score is selected as the defect type of the rectangular image(s).

In some embodiments, before the defect type corresponding to the maximum similarity score is output, under the condition that the defect type is a specified defect type, the area of the anomaly pixels in the rectangular image is calculated; or under the condition that the area is greater than an area threshold, the defect type corresponding to the maximum similarity score is output.

The area threshold may be a preset value, and different area thresholds may be set for different defect types and different customer requirements. For example, for anode die cutting defects, a rectangular image is considered to be an image with an anode die cutting defect only when the area of the defect is greater than the area threshold, and considered to be a normal image when the area is smaller than the area threshold. In other words, industrial products are defect tolerant to some degree. Therefore, in the foregoing embodiment, a specific defect area indicator can be flexibly controlled according to different area tolerance requirements for a defect.

In some embodiments, under the condition that the maximum similarity score is higher than a second similarity threshold, the defect type corresponding to the maximum similarity score is output, where the second similarity threshold is greater than the first similarity threshold.

In the foregoing optional embodiment, the second similarity threshold may be a preset value, and different customers may set different second similarity thresholds based on their requirements. For different customer requirements, there may be different determining criteria. For example, for a customer, a rectangular image is considered to be a defective image of a known defect type only when a maximum similarity score of the rectangular image for the known defect type is higher than a similarity threshold. In other words, the customer has a higher similarity determining criterion for the purpose of higher classification accuracy. Therefore, the classification accuracy indicator can be flexibly set with the foregoing embodiment.

In some embodiments, the defect detection information further includes a similarity score corresponding to a defect type.

When the defect detection information includes a similarity score corresponding to a defect type, a similarity of a defect type of the image for inspection to a known defect type can be seen intuitively, helping the staff to determine, based on the similarity score, whether manual determining needs to be performed to check whether the defect detection is accurate.

The method embodiment of the embodiments of this application has been described in detail above, and the apparatus embodiment of the embodiments of this application is described below. The apparatus embodiment and the method embodiment correspond to each other, and therefore for content not described in detail, reference may be made to the previous method embodiment. The apparatus can implement any possible embodiment of the foregoing method.

Figure 6:
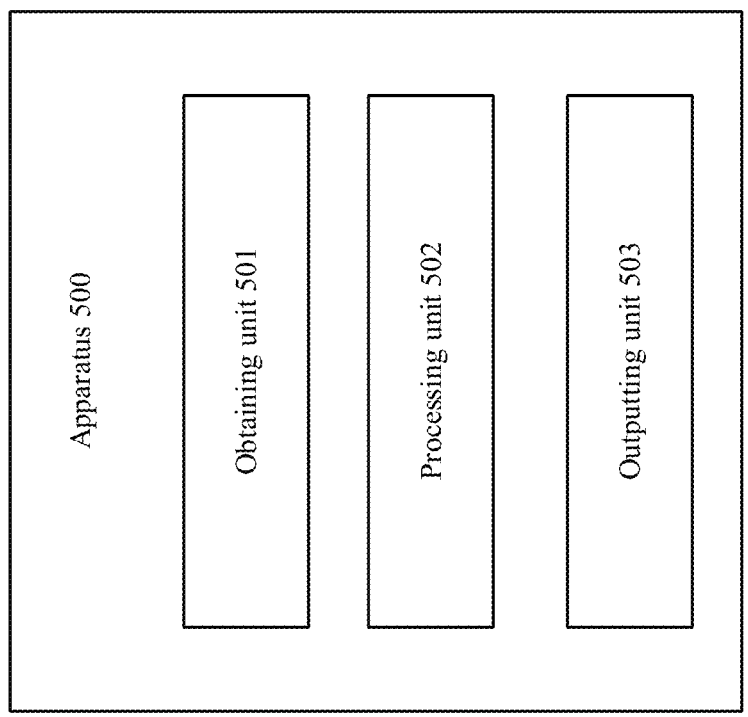
FIG. 6 is a schematic block diagram of a defect detection apparatus according to an embodiment of this application.

FIG. 6 is a schematic block diagram of a defect detection apparatus 500 according to an embodiment of this application. The apparatus 500 may perform the defect detection method of the foregoing embodiments of this application. For example, the apparatus 500 may be the foregoing processing apparatus 110.

As shown in FIG. 6, the apparatus includes:
an obtaining unit 501 configured to obtain an image for inspection; and
a processing unit 502 configured to perform anomaly detection on the image for inspection to obtain an anomaly region image corresponding to the image for inspection; where
the processing unit 502 is further configured to perform defect classification on the anomaly region image to obtain defect detection information of the image for inspection.

In some embodiments, the processing unit 502 is further configured to obtain, based on an anomaly detection model, a difference image used to represent an anomaly region; and segment the difference image based on a segmentation threshold to obtain the anomaly region image.

In some embodiments, the anomaly detection model includes a pre-trained teacher network and a student network distilled from the teacher network; the processing unit 502 is further configured to input the image for inspection into both the teacher network and the student network so as to obtain a feature image output by the teacher network and a feature image output by the student network; and calculate a difference between each pixel of the feature image output by the teacher network and each pixel of the feature image output by the student network to obtain the difference image.

In some embodiments, the processing unit 502 is further configured to take pixels higher than the segmentation threshold in the difference image as anomaly pixels and remaining pixels as normal pixels, so as to obtain the anomaly region image.

In some embodiments, the processing unit 502 is further configured to train the student network of the anomaly detection model.

In some embodiments, the processing unit 502 is further configured to initialize the student network; input normal images into the teacher network and the student network to obtain feature images of all layers output by the teacher network and feature images corresponding to all layers output by the student network; minimize differences between the feature images of all layers output by the teacher network and the feature images corresponding to all layers output by the student network in a distillation loss function; and update parameters of the student network based on loss calculation results.

In some embodiments, the processing unit 502 is further configured to calculate an optimal anomaly determining threshold of the optimal anomaly detection model of the anomaly detection model; and the processing unit 502 is further configured to set the segmentation threshold based on the optimal anomaly determining threshold.

In some embodiments, the processing unit 502 is further configured to input a test sample into both the teacher network and the student network, where the test sample is a defective image or a normal image; and determine a maximum value in difference images between the feature images output by the teacher network and the feature images output by the student network as an anomaly value of the test sample. If the anomaly value is greater than the anomaly determining threshold, the processing unit 502 is further configured to determine that the test sample is a defective image, otherwise, determine that the test sample is a normal image. The processing unit 502 is further configured to calculate a difference between a false positive rate and a true positive rate corresponding to each anomaly determining threshold in the anomaly detection model, and determine an anomaly determining threshold corresponding to a maximum difference as the optimal anomaly determining threshold. The false positive rate is a percentage of test samples that are incorrectly determined as a defective image, and the true positive rate is a percentage of test samples that are correctly determined as a defective image.

In some embodiments, the processing unit 502 is further configured to set the segmentation threshold to be less than the optimal anomaly determining threshold.

In some embodiments, the obtaining unit 501 is further configured to obtain one or more rectangular images including anomaly pixels from the anomaly region image; and perform defect classification on the one or more rectangular images.

In some embodiments, the processing unit 502 is further configured to classify the rectangular image(s) by using a defect classification model.

In some embodiments, the obtaining unit 501 is further configured to obtain a feature vector of the rectangular image(s); calculate a similarity score of the rectangular image(s) in terms of each known defect type based on the feature vector; and perform defect classification on the rectangular image(s) based on the similarity score.

In some embodiments, the processing unit 502 is further configured to extract the feature vector of the rectangular image(s) by using a ResNet network model.

In some embodiments, the processing unit 502 is further configured to map the feature vector to a trained feature vector space, where the feature vector space includes a feature vector for the known defect type; and calculate a distance between the feature vector and the feature vector for the known defect type, so as to obtain the similarity score of the rectangular image(s) for each known defect type.

In some embodiments, the apparatus further includes an outputting unit 503; where under the condition that a maximum similarity score of the similarity scores is not lower than a first similarity threshold, the outputting unit 503 is configured to output a defect type corresponding to the maximum similarity score; or under the condition that the similarity scores are all lower than a first similarity threshold, the outputting unit 503 is configured to output an unknown defect type.

In some embodiments, the processing unit 502 is further configured to: under the condition that the defect type is a specified defect type, calculate area of the anomaly pixels in the rectangular image; and the outputting unit 503 further includes: under the condition that the area is greater than an area threshold, outputting the defect type corresponding to the maximum similarity score.

In some embodiments, the outputting unit 503 is further configured to: under the condition that the maximum similarity score is higher than a second similarity threshold, output the defect type corresponding to the maximum similarity score, where the second similarity threshold is greater than the first similarity threshold.

Figure 7:
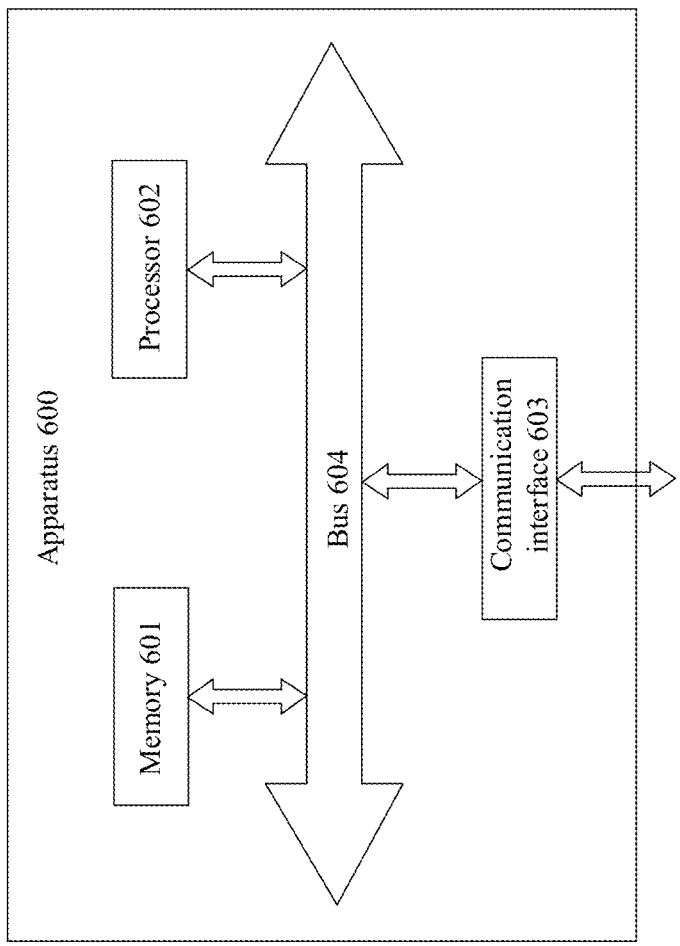
FIG. 7 is a schematic structural diagram of a defect detection apparatus according to an embodiment of this application.

FIG. 7 is a schematic structural diagram of hardware of a defect detection apparatus according to an embodiment of this application. The defect detection apparatus 600 shown in FIG. 7 includes a memory 601, a processor 602, a communication interface 603, and a bus 604. The memory 601, the processor 602, and the communication interface 603 are connected to each other via the bus 604.

The memory 601 may be a read-only memory (read-only memory, ROM), a static storage device, or a random access memory (random access memory, RAM). The memory 601 may store a program. When the program stored in the memory 601 is executed by the processor 602, the processor 602 and the communication interface 603 are configured to perform the steps of the defect detection method of the embodiments of this application.

The processor 602 may be a general-purpose central processing unit (central processing unit, CPU), a microprocessor, an application specific integrated circuit (application specific integrated circuit, ASIC), a graphics processing unit (graphics processing unit, GPU), or one or more integrated circuits, and is configured to execute a related program so as to implement the functions required by the units in the defect detection apparatus of this embodiment of this application, or perform the defect detection method of the embodiments of this application.

The processor 602 may alternatively be an integrated circuit chip with a signal processing capability. During implementation, the steps of the defect detection method in the embodiments of this application can be implemented by hardware integrated logic circuits in the processor 602 or instructions in the form of software.

The processor 602 may alternatively be a general-purpose processor, a digital signal processor (digital signal processor, DSP), an ASIC, a field programmable gate array (field programmable gate array, FPGA) or another programmable logic device, a discrete gate or transistor logic device, or a discrete hardware component. The processor 602 can implement or perform the methods, steps, and logic block diagrams disclosed in the embodiments of this application. The general-purpose processor may be a microprocessor, or the processor may also be any conventional processor or the like. Steps of the methods disclosed with reference to the embodiments of this application may be directly performed and completed by using a hardware processor, or may be performed and completed by using a combination of hardware in the processor and a software module. The software module may be located in a storage medium mature in the art, such as a random access memory, a flash memory, a read-only memory, a programmable read-only memory or electrically erasable programmable memory, or a register. The storage medium is located in the memory 601. The processor 602 fetches information in the memory 601, and completes, together with hardware of the processor 602, the functions required by the units in the defect detection apparatus of this embodiment of this application, or performs the defect detection method of the embodiments of this application.

The communication interface 603 implements communication between the apparatus 600 and other devices or communication networks by using a transceiver apparatus such as but not limited to a transceiver. For example, traffic data of an unknown device may be obtained through the communication interface 603.

The bus 604 may include a path for transferring information between various components of the apparatus 600 (for example, the memory 601, the processor 602, and the communication interface 603).

It should be noted that although only the memory, the processor, and the communication interface of the apparatus 600 are shown, in specific implementation, persons skilled in the art should understand that the apparatus 600 may further include other components necessary for normal operation. In addition, persons skilled in the art should understand that based on specific needs, the apparatus 600 may further include a hardware component for implementing other additional functions. In addition, persons skilled in the art should understand that the apparatus 600 may include only components necessary for implementing the embodiments of this application, and does not necessarily include all the components shown in FIG. 7.

An embodiment of this application further provides a computer-readable storage medium. The medium stores program code to be executed by a device. The program code includes instructions for performing the steps of the foregoing defect detection method.

An embodiment of this application further provides a computer program product. The computer program product includes a computer program stored in a computer-readable storage medium, and the computer program includes program instructions. When the program instructions are executed by a computer, the computer is enabled to perform the foregoing defect detection method.

The computer-readable storage medium may be a transitory computer-readable storage medium, or a non-transitory computer-readable storage medium.

It may be clearly understood by a person skilled in the art that, for the purpose of convenient and brief description, for a detailed working process of the foregoing apparatus, reference may be made to a corresponding process in the foregoing method embodiments, and details are not described again herein.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The terms used in this application are merely used to describe the embodiments and not to limit the claims. As used in the description of the embodiments and the claims, unless otherwise clearly stated in the context, singular forms "a/an" and "the" also include plural forms. Similarly, the term "and/or" as used in this application intends to include any and all possible combinations of one or more of associated listed items. In addition, when used in this application, the term "include" specifies that the stated features, integers, steps, operations, elements, and/or components exist, but does not preclude that one or more other features, integers, steps, operations, elements, components, and/or groupings thereof exist or are added.

The aspects, implementations, or features of the described embodiments can be used alone or in any combination. The aspects of the described embodiments may be implemented by software, hardware, or a combination of software and hardware. The described embodiments may alternatively be embodied by a computer-readable medium that stores computer-readable code. The computer-readable code includes instructions executable by at least one computing apparatus. The computer-readable medium may be associated with any data storage apparatus that can store data. The data can be accessed by a computer system. An example computer-readable medium may include read-only memory, random access memory, compact disc read-only memory (Compact Disc Read-Only Memory, CD-ROM), hard disk drive (Hard Disk Drive, HDD), digital video disc (Digital Video Disc, DVD), magnetic tape, optical data storage apparatus, or the like. The computer-readable medium may alternatively be distributed over a computer system connected via a network so that the computer-readable code can be stored and executed in a distributed manner.

The foregoing technical description may refer to the accompanying drawings that are a part of this application and presents the implementation in accordance with the described embodiments in the accompanying drawings. Although these embodiments are described in sufficient detail to enable persons skilled in the art to implement the embodiments, these embodiments are not limitative so that other embodiments can be used. In addition, modifications may further be made without departing from the scope of the described embodiments. For example, the operation order described in the flowcharts is not limitative, and therefore the order of two or more operations illustrated in and described in accordance with the flowchart may be changed based on several embodiments. For another example, in several embodiments, one or more operations illustrated in and described in accordance with the flowchart are optional, or may be deleted. In addition, some steps or functionalities may be added to the disclosed embodiments, or two or more steps may be permuted. All such variations are considered to be encompassed by the disclosed embodiments and the claims.

Additionally, terms are used in the foregoing technical description to provide a thorough understanding of the described embodiments. However, undue detail is not required to implement the described embodiments. Thus, the foregoing description of the embodiments is presented for purposes of illustration and description. The embodiments presented in the foregoing description, and examples disclosed in accordance with these embodiments are provided to offer context and facilitate understanding of the described embodiments. The foregoing description is not intended to be exhaustive or limit this application to the described embodiments in a precise form. Several modifications, alternatives, and variations are possible in accordance with the foregoing teachings. In some instances, well-known process steps have not been described in detail so as not to unnecessarily obscure the described embodiments. Although this application has been described with reference to the preferred embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

The invention claimed is:

1. A defect detection method, comprising:
obtaining an image for inspection;
performing anomaly detection on the image for inspection to obtain an anomaly region image corresponding to the image for inspection, the anomaly region image having an anomaly region and a normal region without defect and the performing the anomaly detection including:
setting a segmentation threshold by increasing the segmentation threshold to decrease the anomaly region and decreasing the segmentation threshold to increase the anomaly region, and
electronically marking the anomaly region of the anomaly region image based on the set segmentation threshold; and
performing defect classification only on the anomaly region and not the normal region of the anomaly region image to obtain defect detection information of the image for inspection,
wherein the image for inspection is of a portion of a battery.

2. The defect detection method according to claim 1, wherein the defect detection information comprises defect type information and defect location information of the anomaly region image.

3. The defect detection method according to claim 2, wherein the defect detection information further comprises a similarity score corresponding to a defect type.

4. The defect detection method according to claim 1, wherein the performing anomaly detection on the image for inspection to obtain the anomaly region image corresponding to the image for inspection includes:

obtaining, based on an anomaly detection model, a difference image used to represent the anomaly region; and segmenting the difference image based on the set segmentation threshold to obtain the anomaly region image.

5. The defect detection method according to claim 4, wherein the anomaly detection model comprises a pre-trained teacher network and a student network distilled from the teacher network, and wherein the obtaining, based on the anomaly detection model, the difference image used to represent the anomaly region includes:

inputting the image for inspection into both the teacher network and the student network so as to obtain a feature image output by the teacher network and a feature image output by the student network, and calculating a difference between each pixel of the feature image output by the teacher network and each pixel of the feature image output by the student network to obtain the difference image.

6. The defect detection method according to claim 5, wherein before the performing anomaly detection on the image for inspection, the method further comprises:

training the student network of the anomaly detection model.

7. The defect detection method according to claim 6, wherein the training the student network comprises:

initializing the student network;

inputting normal images into the teacher network and the student network to obtain feature images of all layers output by the teacher network and feature images corresponding to all layers output by the student network;

minimizing differences between the feature images of all layers output by the teacher network and the feature images corresponding to all layers output by the student network in a distillation loss function; and updating parameters of the student network based on loss calculation results.

8. The defect detection method according to claim 5, wherein the method further comprises:

calculating an optimal anomaly determining threshold of the anomaly detection model; and the setting the segmentation threshold is based on the optimal anomaly determining threshold.

9. The defect detection method according to claim 8, wherein the calculating the optimal anomaly determining threshold of the anomaly detection model includes:

inputting a test sample into both the teacher network and the student network, wherein the test sample is a defective image or a normal image;

determining a maximum value in difference images between the feature images output by the teacher network and the feature images output by the student network as an anomaly value of the test sample;

under the condition that the anomaly value is greater than the anomaly determining threshold, determining that the test sample is a defective image, otherwise, determining that the test sample is a normal image; and calculating a difference between a false positive rate and a true positive rate corresponding to each anomaly determining threshold in the anomaly detection model, and determining an anomaly determining threshold corresponding to a maximum difference as the optimal anomaly determining threshold; wherein the false positive rate is a percentage of test samples that are incorrectly determined as a defective image, and the true positive rate is a percentage of test samples that are correctly determined as a defective image.

10. The defect detection method according to claim 8, wherein the setting the segmentation threshold based on the optimal anomaly determining threshold includes:

setting the segmentation threshold to be less than the optimal anomaly determining threshold.

11. The defect detection method according to claim 4, wherein the segmenting the difference image based on the segmentation threshold to obtain the anomaly region image includes:

taking pixels higher than the segmentation threshold in the difference image as anomaly pixels and remaining pixels as normal pixels, so as to obtain the anomaly region image.

12. The defect detection method according to claim 1, wherein before the performing defect classification on the anomaly region image, the method further comprises:

obtaining one or more rectangular images comprising anomaly pixels from the anomaly region image, wherein the performing defect classification on the anomaly region image includes:

performing defect classification on the one or more rectangular images.

13. The defect detection method according to claim 12, wherein the performing defect classification on the one or more rectangular images includes:

classifying the rectangular image(s) by using a defect classification model.

14. The defect detection method according to claim 13, wherein the classifying the rectangular image(s) by using the defect classification model includes:

obtaining a feature vector of the rectangular image(s);

calculating a similarity score of the rectangular image(s) for each known defect type based on the feature vector; and performing defect classification on the rectangular image(s) based on the similarity score.

15. The defect detection method according to claim 14, wherein the obtaining the feature vector of the rectangular image(s) includes:

extracting the feature vector of the rectangular image(s) by using a ResNet network model.

16. The defect detection method according to claim 14, wherein the calculating the similarity score of the rectangular image(s) for each known defect type based on the feature vector includes:

mapping the feature vector to a trained feature vector space, wherein the feature vector space comprises a feature vector for the known defect type; and calculating a distance between the feature vector and the feature vector for the known defect type, so as to obtain the similarity score of the rectangular image(s) for each known defect type.

17. The defect detection method according to claim 14, wherein the performing classification on the rectangular image(s) based on the similarity score comprises includes:

under the condition that a maximum similarity score of the similarity scores is not lower than a first similarity threshold, outputting a defect type corresponding to the maximum similarity score; or under the condition that the similarity scores are all lower than the first similarity threshold, outputting an unknown defect type.

18. The defect detection method according to claim 17, wherein before the outputting a defect type corresponding to the maximum similarity score, the method further comprises:
- under the condition that the defect type is a specified defect type, calculating area of the anomaly pixels in the rectangular image, wherein
- the outputting the defect type corresponding to the maximum similarity score includes:
  - under the condition that the area is greater than an area threshold, outputting the defect type corresponding to the maximum similarity score.

19. The defect detection method according to claim 17, wherein the outputting the defect type corresponding to the maximum similarity score includes:
- under the condition that the maximum similarity score is higher than a second similarity threshold, outputting the defect type corresponding to the maximum similarity score, wherein the second similarity threshold is greater than the first similarity threshold.

20. The defect detection method according to claim 1,
- wherein the obtaining the image is performed using a charge coupled camera, and
- wherein the performing of the anomaly detection and the defect classification includes anomaly detection and defect classification of multiple defects of the portion of the battery.

\* \* \* \* \*